UNITED STATES PATENT OFFICE.

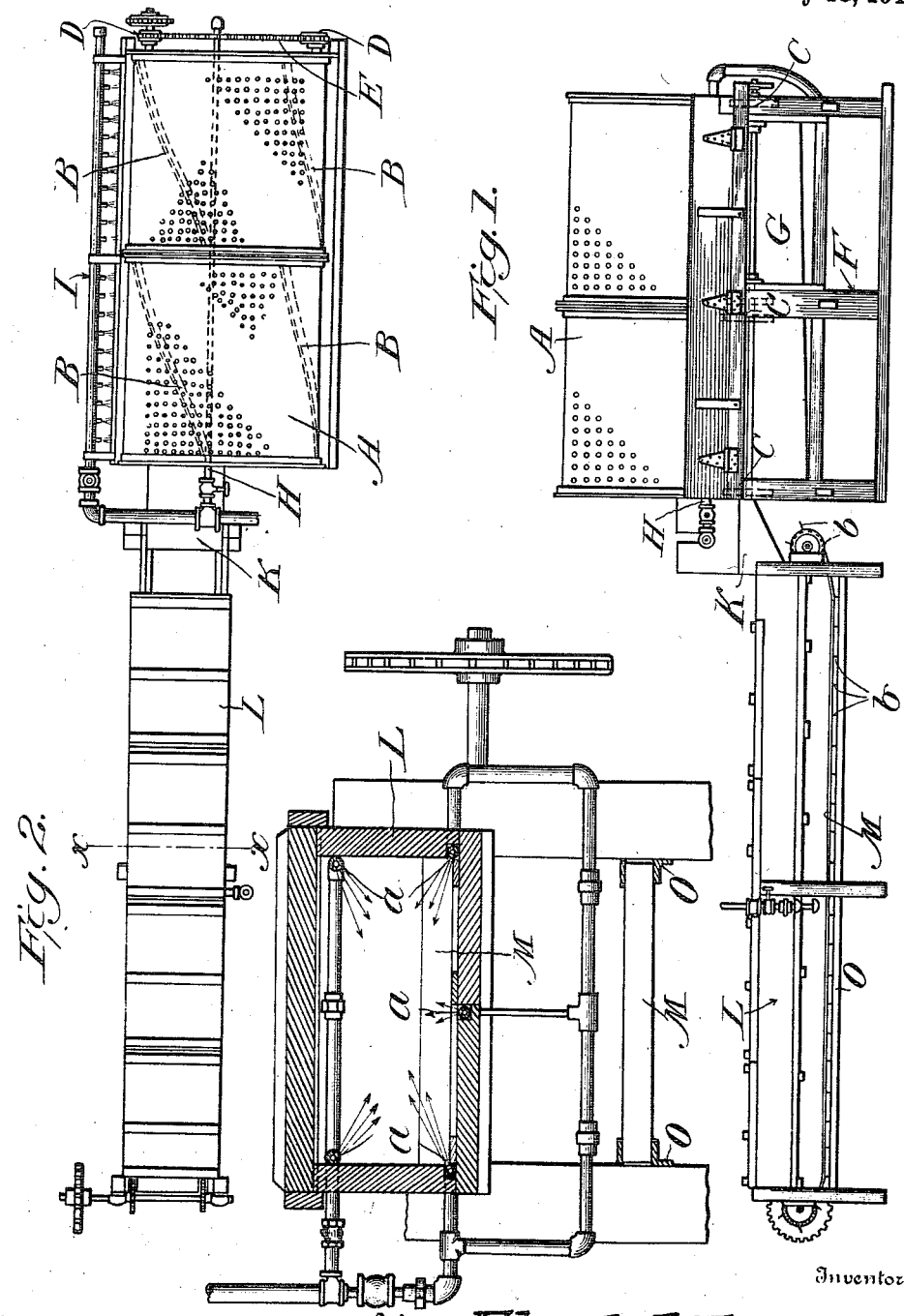

EDWARD J. JUDGE, OF SAN FRANCISCO, CALIFORNIA.

PROCESS OF WASHING VEGETABLES AND PARTIALLY COOKING THE SAME.

957,466.  Specification of Letters Patent.  Patented May 10, 1910.

Application filed October 5, 1908. Serial No. 456,148.

*To all whom it may concern:*

Be it known that I, EDWARD J. JUDGE, a citizen of the United States, residing in the city and county of San Francisco and State of California, have invented certain new and useful Improvements in Processes of Washing Vegetables and Partially Cooking the Same, of which the following is a specification.

This invention relates to a process of washing and cooking vegetables and particularly spinach, and the same comprehends advancing the spinach along or through a carrier, and agitating or tumbling the spinach and subjecting it while in motion to the action of a spray or sprays of water for the purpose of cleansing the spinach and eliminating any grit or foreign matter which it may contain; then transferring the washed spinach to a heating chamber and advancing it therethrough in the presence of steam or hot water for the purpose of partially cooking the vegetable, and then delivering the vegetable in its cleansed and partially-cooked condition from the cooking chamber so that it may be placed in cans or other receptacles for marketable purposes.

My invention further comprehends the step of separating the drippings or water of condensation from the vegetable during its passage through the cooking chamber, and discharging the drain-water independently of the vegetable and at the opposite portion of the apparatus.

In the accompanying drawing I have shown mechanism which is capable of carrying out my invention, although I wish it understood that I do not limit the process to this or any other particular type of apparatus, except that the apparatus employed shall contain a carrier through or along which the spinach is advanced during the washing process; and a cooking chamber with which the washing apparatus preferably, but not necessarily connects to deliver the spinach thereinto whereby the cooking step may immediately follow the washing step and without any separate and independent handling of the vegetable.

Figure 1, is a side elevation o. one type of apparatus by which my process may be carried out, Fig. 2, is a plan view, Fig. 3, is a cross-sectional view on the line *x—x* of Fig. 2.

In order that my process may be fully understood, I will now refer to the accompanying drawings wherein, A, represents a horizontally-disposed revoluble drum which may represent one form of carrier capable of carrying out the washing part of my process. This drum is formed of perforated material of some appropriate type and along its interior there will be secured appropriate flanges, B, of substantially spiral form for directing the vegetable through the carrier from end to end as the carrier rotates. Any suitable means may be employed for mounting and rotating the carrier; for instance, in Fig. 1, I show the drum or carrier as being mounted upon bearing wheels, C, placed at opposite sides of the center and beneath the lower portion, said wheels being mounted on shafts which are provided with sprocket wheels, D, around which pass chains, E, and said wheels, C, frictionally engaging the periphery of the drum and thereby rotating said drum as power is communicated through the wheels thereto. The drum is mounted in a suitable stationary frame, F, and in this frame beneath the drum is a trough or hopper, G, which receives the drainings and wash water delivered through the perforations of the drum.

Passing longitudinally through the drum is a spray pipe, H, which connects with a suitable source of water supply, and when the drum is in motion and the spinach is agitated and tumbled about therein, the spinach is brought in contact with the hydraulic jets delivered from said pipe, and the dirt or grit which the spinach contains is loosened and eliminated and finally discharged through the perforations of the drum into the underneath trough or hopper above mentioned. In order that the jets delivered from the hydraulic spray-pipe may not cause the spinach to be driven against the inner side of the drum and more or less into the perforations, thereby causing the spinach to adhere to the inner wall of the drum and the young leaves to be torn by the frictional engagement with the inner wall of said drum, I prefer to extend along the outside of the drum, a second spray pipe, I, which is also connected with the source of water supply, and is adapted to deliver its jets against the outside of the drum, whereby these jets by directing water inwardly through the perforations of the drum, serve to maintain said perforations clear and unobstructed and to prevent the spinach adhering to the inner side of said drum. The second-named sprays operate more or less in opposition to the first-named sprays and they assist in effecting a complete washing of the spinach, but their primary object is to prevent the clogging of the meshes or perforations in the drum and to prevent the adherence of the young leaves to the inner side of the drum and the consequent injury to said leaves. While the spinach is thus being passed through the drum, it is effectually washed by the hydraulic sprays and by the time it reaches the delivery end of said drum, the spinach has been completely washed and all grit and foreign matter removed therefrom.

At the delivery end of the drum is shown a chute, K, into which the spinach is delivered by the conveyers within the drum, said chute having its outlet end connecting directly with one end of a steam chamber, L. This chamber is of suitable length and is preferably horizontally-disposed although its floor may be inclined rearwardly or toward the drum end of the apparatus in order that any drippings from the spinach and the water of condensation which may accumulate in the chamber, will be delivered rearwardly or in an opposite direction to the travel of the spinach through the chamber. The steam chamber is, preferably, of rectangular form in cross-section and is supplied with perforated steam pipes, a, which are so arranged that their perforations discharge inwardly toward the center of the chamber. As shown in Fig. 3 there is one of these steam pipes located in the upper angles of the chamber; another of said pipes is located in or near each of the lower angles of the chamber, while a still further spray-pipe is in the floor of the chamber in the vertical center thereof. These several pipes are adapted to discharge their jets in the direction of the arrows, and these several steam jets are therefore brought in contact with the spinach as it is advanced through the chamber, thereby heating and partially cooking the previously washed spinach.

Extending horizontally through the steam or heating chamber is an endless conveyer, M, which is preferably in the form of a belt or band of foraminous material having cross strips, b, which are adapted to engage and carry the spinach through the chamber so that every part of the spinach may be brought in contact with the steam jets as it is advanced through the chamber toward the delivery end.

The carrier and steam chamber are mounted upon a suitable frame in which is fixed an angle iron, O, which forms a track-way for the lower run of the endless-belt or carrier.

It will thus be understood that the spinach to be washed and cooked is delivered into the feed end of the drum or carrier and is advanced through the carrier in the presence of hydraulic sprays acting both outwardly and inwardly, thereby completely washing the spinach and keeping the perforations in the drum open for the escape of grit and preventing injury to the young shoots and leaves of the vegetable. As the spinach leaves the drum at the completion of the washing step, it is delivered directly or otherwise into the heating chamber and advanced therethrough in contact with the steam from the perforated pipes before mentioned, and during its passage through this chamber the spinach is heated and is delivered at the rear end of the chamber in a thoroughly cleansed and partially cooked condition ready for canning.

What I claim as new and desire to secure by Letters Patent is:

1. The process herein described of washing spinach, said process consisting in advancing the spinach through and along a revoluble foraminous container and subjecting the spinach while in motion to the action of fluid sprays operating from both inside and outside the container whereby the spinach is washed while under movement and is prevented from adhering to the inside of the container.

2. The process herein described of washing and cooking spinach, said process consisting in advancing the spinach through and along a revoluble foraminous container and subjecting the spinach while in motion to the action of fluid sprays operating from both inside and outside the container whereby the spinach is washed while under movement and is prevented from adhering to the inside of the container, and then delivering the spinach directly into a closed chamber and advancing it therethrough in the presence of steam whereby the washed spinach is partially cooked immediately following the washing action and as it passes through the chamber.

In testimony whereof I affix my signature in presence of two witnesses.

EDWARD J. JUDGE.

Witnesses:
A. MARIE FITZBERGER,
B. NOSENHEIM.